United States Patent
Kakikawa et al.

(10) Patent No.: US 10,253,200 B2
(45) Date of Patent: Apr. 9, 2019

(54) AQUEOUS INK, INK CARTRIDGE, AND INK JET RECORDING METHOD

(71) Applicant: CANON KABUSHIKI KAISHA, Tokyo (JP)

(72) Inventors: Hiroshi Kakikawa, Fujisawa (JP); Minako Kawabe, Koganei (JP); Masashi Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/989,131

(22) Filed: Jan. 6, 2016

(65) Prior Publication Data

US 2016/0215157 A1 Jul. 28, 2016

(30) Foreign Application Priority Data

Jan. 23, 2015 (JP) .................................. 2015-011093

(51) Int. Cl.

| | |
|---|---|
| *B41J 2/165* | (2006.01) |
| *C09D 11/38* | (2014.01) |
| *C09D 11/102* | (2014.01) |
| *C09D 11/107* | (2014.01) |
| *C09D 11/326* | (2014.01) |
| *C08K 3/04* | (2006.01) |
| *C08K 5/06* | (2006.01) |

(Continued)

(52) U.S. Cl.

CPC ............... *C09D 11/38* (2013.01); *C08K 3/04* (2013.01); *C08K 5/06* (2013.01); *C08K 5/23* (2013.01); *C08K 5/3415* (2013.01); *C08K 5/3417* (2013.01); *C08K 5/3437* (2013.01); *C09D 11/102* (2013.01); *C09D 11/107* (2013.01); *C09D 11/326* (2013.01)

(58) Field of Classification Search

None

See application file for complete search history.

(56) References Cited

U.S. PATENT DOCUMENTS

| | | |
|---|---|---|
| 4,756,963 A | 7/1988 | Yamamoto et al. |
| 4,780,348 A | 10/1988 | Yamamoto et al. |

(Continued)

FOREIGN PATENT DOCUMENTS

| | | |
|---|---|---|
| CN | 101115809 A | 1/2008 |
| EP | 2 644 404 A2 | 10/2013 |

(Continued)

OTHER PUBLICATIONS

Polymer Handbook, Fourth Edition, J. Brandrup et al., Editors, John Wiley & Sons, Inc., (1999).

(Continued)

*Primary Examiner* — Alejandro Valencia

(74) *Attorney, Agent, or Firm* — Venable LLP

(57) ABSTRACT

An aqueous ink for ink jet including a pigment; a water-soluble acrylic resin for dispersing the pigment; a water-soluble urethane resin; and a nonionic fluorinated surfactant. The water-soluble acrylic resin includes a copolymer having two or more units derived from two or more kinds of monomers, and of the two or more units, a unit derived from a monomer that gives a homopolymer having a glass transition temperature Tg of 0° C. or more is contained in a proportion of 95.0% by mass or more. The water-soluble urethane resin has a weight-average molecular weight of 6,000 or more.

1 Claim, 2 Drawing Sheets

(51) Int. Cl.
C08K 5/23 (2006.01)
C08K 5/3415 (2006.01)
C08K 5/3417 (2006.01)
C08K 5/3437 (2006.01)

(56) References Cited

U.S. PATENT DOCUMENTS

| | | | |
|---|---|---|---|
| 5,082,496 A | 1/1992 | Yamamoto et al. | |
| 5,123,960 A | 6/1992 | Shirota et al. | |
| 5,127,946 A | 7/1992 | Eida et al. | |
| 5,130,723 A | 7/1992 | Yamamoto et al. | |
| 5,167,703 A | 12/1992 | Eida et al. | |
| 5,178,671 A | 1/1993 | Yamamoto et al. | |
| 5,213,614 A | 5/1993 | Eida et al. | |
| 5,215,577 A | 6/1993 | Eida et al. | |
| 5,215,578 A | 6/1993 | Eida et al. | |
| 5,258,505 A | 11/1993 | Eida et al. | |
| 5,415,686 A | 5/1995 | Kurabayashi et al. | |
| 5,451,251 A | 9/1995 | Mafune et al. | |
| 5,482,545 A | 1/1996 | Aoki et al. | |
| 5,571,313 A | 11/1996 | Mafune et al. | |
| 5,728,201 A | 3/1998 | Saito et al. | |
| 5,911,815 A | 6/1999 | Yamamoto et al. | |
| 6,003,987 A | 12/1999 | Yamamoto et al. | |
| 6,007,182 A | 12/1999 | Matsubara et al. | |
| 6,027,210 A | 2/2000 | Kurabayashi et al. | |
| 6,062,674 A | 5/2000 | Inui et al. | |
| 6,174,354 B1 | 1/2001 | Takizawa et al. | |
| 6,186,615 B1 | 2/2001 | Sato et al. | |
| 6,281,917 B1 | 8/2001 | Katsuragi et al. | |
| 6,966,944 B2 | 11/2005 | Shimomura et al. | |
| 7,208,033 B2 | 4/2007 | Kawabe et al. | |
| 7,244,299 B2 | 7/2007 | Tsuji et al. | |
| 7,297,194 B2 | 11/2007 | Shinjo et al. | |
| 7,364,770 B2 | 4/2008 | Nagashima et al. | |
| 7,445,666 B2 | 11/2008 | Yanagimachi et al. | |
| 7,618,484 B2 | 11/2009 | Fujimoto et al. | |
| 7,622,513 B2 | 11/2009 | Sarkisian et al. | |
| 7,637,603 B2 | 12/2009 | Kawabe et al. | |
| 7,977,408 B2 | 7/2011 | Matsuyama et al. | |
| 8,025,722 B2 | 9/2011 | Kawabe et al. | |
| 8,070,871 B2 | 12/2011 | Kawabe et al. | |
| 8,343,269 B2 | 1/2013 | Takahashi et al. | |
| 8,602,544 B2 | 12/2013 | Kawabe et al. | |
| 8,636,350 B2 | 1/2014 | Takayama et al. | |
| 8,814,341 B2 | 8/2014 | Nagao et al. | |
| 8,871,013 B2 | 10/2014 | Sakai et al. | |
| 8,876,962 B2 | 11/2014 | Yamamoto et al. | |
| 9,187,662 B2 | 11/2015 | Yamamoto et al. | |
| 2006/0116439 A1 | 6/2006 | Sarkisian et al. | |
| 2006/0152570 A1 | 7/2006 | Ishikawa et al. | |
| 2006/0194897 A1 | 8/2006 | Kawabe et al. | |
| 2009/0239044 A1* | 9/2009 | Habashi | C09D 11/30 428/195.1 |
| 2012/0050383 A1 | 3/2012 | Takayama et al. | |
| 2013/0029045 A1* | 1/2013 | Koganehira | C09D 137/00 427/256 |
| 2013/0083117 A1* | 4/2013 | Ohmoto | C09D 11/10 347/20 |
| 2013/0328973 A1 | 12/2013 | Kakikawa et al. | |
| 2014/0240391 A1* | 8/2014 | Goto | C09D 11/30 347/20 |
| 2014/0364548 A1* | 12/2014 | Everhardus | C09D 11/322 524/166 |

FOREIGN PATENT DOCUMENTS

| | | |
|---|---|---|
| JP | 2006-045436 A | 2/2006 |
| JP | 2006-159907 A | 6/2006 |
| JP | 2008-266363 A | 11/2008 |
| JP | 2011-190406 A | 9/2011 |
| JP | 2012-072359 A | 4/2012 |
| JP | 2013-082885 A | 5/2013 |
| JP | 2013-194161 A | 9/2013 |
| WO | 2013/168409 A1 | 11/2013 |

OTHER PUBLICATIONS

Polymer Database: PolyInfo (reference dates of 1997, 2000, 1996, 1957, respectively): http://polymer.nims.go.jp/.

May 27, 2016 European Search Report in European Patent Appln. No. 16000053.5.

Oct. 29, 2018 Chinese Official Action, in a Chinese Patent Appln. No. 201610044455.2.

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, inks containing pigments as coloring materials (pigment inks) have been widely used as an ink used for an ink jet recording method. Such pigment inks are required to enable recording of high-quality images comparable to silver halide photographs. In addition, with improved image quality of recorded images, higher recording speeds are also demanded.

Pigments are, however, present in the form of particles in inks, and thus images recorded with the pigment inks unfortunately have lower glossiness than that of images recorded with dye inks in which dyes are dissolved in an aqueous medium. In order to meet the demand for higher image quality of images to be recorded, various functional materials such as a fluorinated surfactant are added to the pigment inks. When a pigment ink containing the functional material is applied to a recording medium, the pigment and the functional material are deposited on the surface of the recording medium. This reduces the permeability of an ink that is subsequently applied onto the pigment layer to cause such a beading phenomenon that dots of the ink spread to be locally connected to each other, resulting in generation of density unevenness in the resulting image. If the beading is caused, it will be visually observed that unevenness seems to be generated in the solid image.

To solve this problem, various techniques have been disclosed. For example, an ink containing a particular yellow pigment, a water-soluble acrylic resin, a water-soluble urethane resin, a polyoxyethylene alkyl ether having an HLB value of 13 or more, and a water-soluble organic solvent such as triethylene glycol has been disclosed (Japanese Patent Application Laid-Open No. 2012-072359). Moreover, an ink that contains a dipeptide and an anionic fluorinated surfactant containing a lower perfluorohydrocarbon group has been disclosed. This ink can improve image density, fixability, and ink drying properties (Japanese Patent Application Laid-Open No. 2011-190406).

An ink jet recording system using a fixer fluid containing a cationic polymer and an acidic precipitant and using an ink containing an anionic pigment, a nonionic surfactant, an anionic binder, and an organic solvent has also been disclosed (Japanese Patent Application Laid-Open No. 2006-159907). Furthermore, an ink for ink jet recording containing a pigment, a styrene copolymer having a hydrophilic group and functioning as a pigment dispersant, a binder, and water has been disclosed (Japanese Patent Application Laid-Open No. 2013-082885).

SUMMARY OF THE INVENTION

When the ink disclosed in Japanese Patent Application Laid-Open No. 2012-072359 is used, the glossiness, the color developability, and the weatherability of the resulting images are improved, but the beading resistance level is insufficient. The ink disclosed in Japanese Patent Application Laid-Open No. 2011-190406 contains the anionic fluorinated surfactant, and thus the viscosity of the ink increases on the surface of a recording medium. As the viscosity of the ink increases, its filling function increases, and thus both the beading resistance level and the glossiness level become insufficient. When the ink used in the recording system disclosed in Japanese Patent Application Laid-Open No. 2006-159907 has been studied without using the fixer fluid in combination, the glossiness level becomes insufficient. The ink disclosed in Japanese Patent Application Laid-Open No. 2013-082885 provides insufficient beading resistance level and insufficient glossiness level.

An object of the present invention is to provide an aqueous ink for ink jet which enables recording of images having inconspicuous beading and excellent glossiness. Another object of the present invention is to provide an ink cartridge and an ink jet recording method using the aqueous ink.

The above object is achieved by the following present invention. The present invention provides an aqueous ink for ink jet including a pigment, a water-soluble acrylic resin for dispersing the pigment, a water-soluble urethane resin, and a nonionic fluorinated surfactant. In the aqueous ink, the water-soluble acrylic resin is a copolymer having two or more units derived from two or more kinds of monomers; of the two or more units, a unit derived from a monomer that gives a homopolymer having a glass transition temperature Tg of 0° C. or more is contained in a proportion of 95.0% by mass or more; and the water-soluble urethane resin has a weight-average molecular weight of 6,000 or more.

According to the present invention, an aqueous ink for ink jet which enables recording of images having inconspicuous beading and excellent glossiness can be provided. According to the present invention, an ink cartridge and an ink jet recording method using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
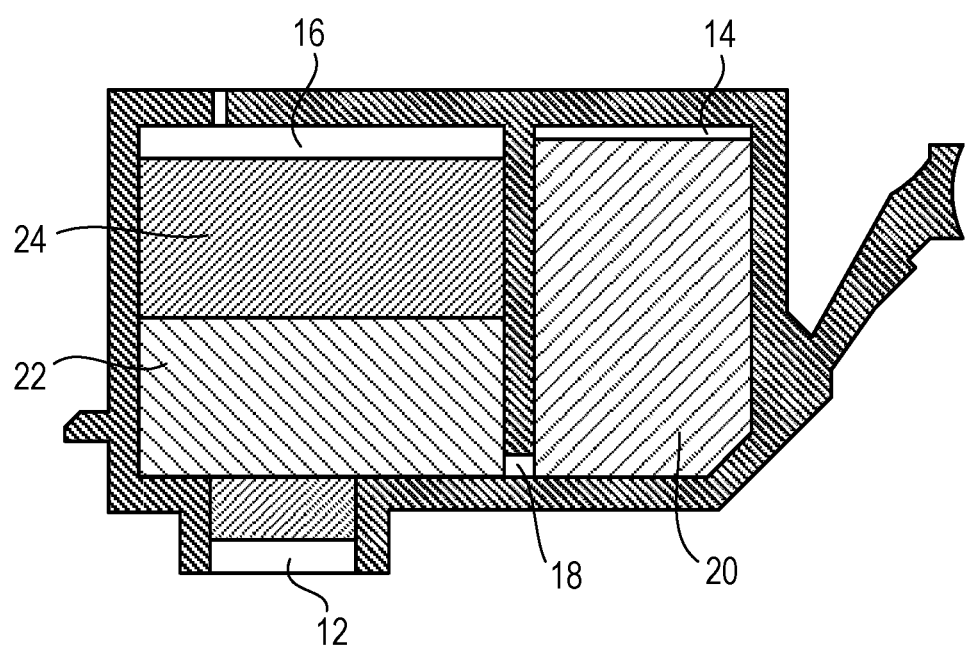
FIG. 1 is a schematic sectional view illustrating an ink cartridge according to an embodiment of the present invention.

The present invention will now be described in detail with reference to preferred embodiments. An aqueous ink for ink jet is also simply called "ink". Various physical property values in the present invention are the values determined at 25° C. unless otherwise noted.

The results of the study have revealed that by adding to an ink a pigment, a water-soluble acrylic resin for dispersing the pigment, a water-soluble urethane resin, and a nonionic fluorinated surfactant, images having suppressed beading and excellent glossiness can be recorded. The inventors of the present invention suppose that such an effect can be achieved by the following mechanism.

In order to impart glossiness to images, an ink containing a resin-dispersed pigment which employs a water-soluble acrylic resin as a resin dispersant, and a water-soluble urethane resin has been studied first. As a result, a certain effect is achieved in the glossiness of images, but the beading resistance level is insufficient. Next, in order to improve the beading resistance, a nonionic fluorinated surfactant has been added to the ink, and the resulting ink has been further studied. The study has revealed that the image recorded with the ink containing the nonionic fluorinated surfactant has lower glossiness than that of an image recorded with an ink containing no nonionic fluorinated surfactant. The study has also revealed that the beading resistance level is not improved. In particular, the permeability of the ink is improved by the addition of the fluorinated surfactant, but it has been observed that dots seem to be locally connected to each other and to result in generation of density unevenness in the resulting image. The inventors suppose the reason why such density unevenness is caused in images is as follows.

A hydrophobic group (perfluoroalkyl group) constituting the fluorinated surfactant exhibits very strong hydrophobicity among various surfactants usable in the aqueous inks, and thus has very high orientation performance with respect to an interface. On this account, in the ink containing a resin-dispersed pigment and a water-soluble urethane resin, the fluorinated surfactant is supposed to cause adsorption exchange between the particle surface of the pigment and the resin dispersant to some extent. If the fluorinated surfactant is adsorbed onto the particle surface of the pigment, the fluorinated surfactant, together with the pigment, is likely to be left on the surface of a recording medium, and thus the fluorinated surfactant is present on the surface of the pigment layer formed. If a compound containing a fluorine atom is present on the surface, the pigment layer typically has a low surface energy. On this account, the presence of the fluorinated surfactant on the surface of the pigment layer causes the surface to repel an ink subsequently applied. Accordingly, dots are locally connected to each other to result in generation of density unevenness in images, and the beading resistance is supposed to become insufficient.

Meanwhile, the water-soluble urethane resin has characteristics of increasing the surface energy of a pigment layer formed and helping the pigment layer to be wetted with an ink subsequently applied. In other words, the addition of the fluorinated surfactant and the water-soluble urethane resin to an ink is a combination use of materials having incompatible characteristics from the viewpoint of repelling and wetting of an ink on the surface of a pigment layer. It is supposed that if a fluorinated surfactant is present on the surface of a pigment layer, the surface is not uniformly wetted with a subsequently applied ink even when a water-soluble urethane resin is present, and thus a level difference is generated among a plurality of dots to deteriorate the glossiness of an image. In addition, the fluorinated surfactant adsorbed onto the particle surface of a pigment subtly destabilizes the dispersion state of the resin-dispersed pigment, and thus the cohesive power of the pigment is increased. Accordingly, the smoothness of the surface of a pigment layer formed deteriorates and the wettability of an ink deteriorates. Due to the above reasons, it is supposed that the wettability of the ink with respect to the pigment layer deteriorates and the glossiness of the image deteriorates.

The inventors of the present invention have assumed that if the permeability of an ink to a recording medium can be improved by adding a fluorinated surfactant to the ink and if an water-soluble urethane resin can be selectively left on the surface of a pigment layer, both the glossiness and the beading resistance of images can be satisfied. Based on such assumption, the inventors have further studied the relation of a water-soluble acrylic resin for dispersing a pigment, a water-soluble urethane resin added to an ink, and a fluorinated surfactant. The inventors have consequently found that by using (1) a water-soluble acrylic resin, (2) a water-soluble urethane resin, and (3) a fluorinated surfactant, shown below, the glossiness and the beading resistance of images can be improved.

(1) A water-soluble acrylic resin that is a copolymer having two or more units derived from two or more kinds of monomers, in which, of the two or more units, a unit derived from a monomer that gives a homopolymer having a glass transition temperature Tg of 0° C. or more is contained in a proportion of 95.0% by mass or more;

(2) A water-soluble urethane resin having a weight-average molecular weight of 6,000 or more;

(3) A nonionic fluorinated surfactant.

Beading Suppression

First, the mechanism for improving the beading resistance of images by using (1) the water-soluble acrylic resin, (2) the water-soluble urethane resin, and (3) the fluorinated surfactant will be described. By using (1) the water-soluble acrylic resin as the resin dispersant for dispersing a pigment, a free volume in which the micro-Brownian motion of the resin can be performed can be suppressed, and thus the movable region of the resin can be reduced. This is because the copolymer has a higher glass transition temperature, and thus, of water-soluble acrylic resins, the resin having such a property is likely to become three-dimensionally rigid. In addition, the nonionic fluorinated surfactant, which has a fluorine atom with a high electron density, is hard as a whole molecule and has poor flexibility. On this account, when the movable region of the resin dispersant becomes small, the adsorption of the nonionic fluorinated surfactant onto the particle surface of the pigment is suppressed. This suppresses the aggregation of the resin-dispersed pigment and can make it difficult to cause the filling function that prevents the permeation of the ink into a recording medium. In addition, the water-soluble urethane resin is dissolved in the ink, and thus the nonionic fluorinated surfactant is unlikely to adsorb to the water-soluble urethane resin. On this account, after the ink is applied to a recording medium, the water-soluble urethane resin is quickly oriented to the interface and is likely to exert the function of increasing the surface energy. The water-soluble urethane resin thus can improve the permeability of the ink to a recording medium.

A hydrophilic moiety of the nonionic fluorinated surfactant has a lower water-solubility than that of an ionic fluorinated surfactant. On this account, it is supposed that when an ink containing the nonionic fluorinated surfactant is applied to a recording medium and then the water evaporates, the viscosity of the ink does not increase rapidly. In addition, when the nonionic fluorinated surfactant is present in combination with a water-soluble urethane resin having a weight-average molecular weight of 6,000 or more, the viscosity increases slowly. Accordingly, it is supposed that the water-soluble urethane resin is left on the surface of a pigment layer while the nonionic fluorinated surfactant permeates the recording medium together with liquid components in the ink. Hence, the nonionic fluorinated surfactant is unlikely to be left on the surface of a pigment layer, and thus the surface energy does not become excessively small. On this account, the ink is not repelled and the permeability of the ink to the recording medium is improved. The beading resistance of the image is supposed to be improved in this manner.

Glossiness

Next, the mechanism for improving the glossiness of images by using (1) the water-soluble acrylic resin, (2) the water-soluble urethane resin, and (3) the fluorinated surfactant will be described. As discussed above, by suppressing the aggregation of the resin-dispersed pigment, a smooth pigment layer is formed. In addition, when the nonionic fluorinated surfactant is present in combination with the water-soluble urethane resin having a weight-average molecular weight of 6,000 or more, the viscosity increases slowly. Accordingly, the water-soluble urethane resin is efficiently left on the surface of a recording medium. Hence, the water-soluble urethane resin is densely filled among the pigment particles, and thus the pigment layer has a higher surface energy. On this account, a level difference is unlikely to be generated among a plurality of dots, and thus the glossiness of an image is supposed to be improved.

Ink

The ink of the present invention is an aqueous ink for ink jet containing a pigment, a water-soluble acrylic resin for dispersing the pigment, a water-soluble urethane resin, and a nonionic fluorinated surfactant. The ink of the present invention is not required to be used in combination with a liquid that causes reaction or viscosity increases when the liquid comes in contact with the ink. Components constituting the ink of the present invention, physical properties of the ink, and the like will next be described in detail.

Pigment

The ink of the present invention contains a pigment as a coloring material. The pigment is exemplified by inorganic pigments such as carbon black and organic pigments, which are well-known in the art. Specifically, carbon black and the organic pigments are preferably used. The content (% by mass) of the pigment in the ink is preferably 0.05% by mass or more to 15.00% by mass or less and more preferably 0.10% by mass or more to 10.00% by mass or less based on the total mass of the ink.

The pigment preferably has an average primary particle size of 10 nm or more to 300 nm or less. If the pigment has an average primary particle size of less than 10 nm, the interaction between primary particles becomes high, and thus the storage stability of the ink is slightly deteriorated in some cases. If the pigment has an average primary particle size of more than 300 nm, the chromaticness or the glossiness of an image is slightly deteriorated in some cases.

The pigment is dispersed in the ink by the water-soluble acrylic resin in consideration of anti-scratching properties of an image to be recorded, for example. In the present invention, "the pigment dispersed in the ink by the water-soluble acrylic resin" is specifically exemplified by the pigments described below. Specifically, the pigment in the form (1) is preferred from the viewpoint of the glossiness of images.

(1) Pigments in which the water-soluble acrylic resin is physically adsorbed onto the particle surface of the pigment.

(2) Resin-bonded self-dispersible pigments in which an organic group in the water-soluble acrylic resin is chemically bonded to the particle surface of the pigments to modify the pigments.

(3) Microcapsule pigments coated with the water-soluble acrylic resin.

Water-Soluble Acrylic Resin (Resin Dispersant)

The ink of the present invention contains a water-soluble acrylic resin (hereinafter also called "resin dispersant") for dispersing the pigment in the ink. In the present invention, the acrylic resin means a resin at least having a unit that has a (meth)acrylic structure derived from (meth)acrylic acid or a (meth)acrylate ester. The acrylic resin is a resin having a unit derived from an acrylic monomer such as (meth)acrylic acid and (meth)acrylate esters. The water-soluble acrylic resin is a copolymer having two or more units derived from two or more kinds of monomers. The water-soluble acrylic resin is preferably a resin having a hydrophilic unit and a hydrophobic unit as constituent units. In the below description, "(meth)acrylic" means "acrylic" and "methacrylic", and "(meth)acrylate" means "acrylate" and "methacrylate".

The hydrophilic unit (a unit having a hydrophilic group such as an acidic group or a hydroxy group) can be formed by polymerizing a monomer having a hydrophilic group, for example. Specific examples of the monomer having a hydrophilic group include anionic monomers including acidic monomers having a carboxy group, such as (meth)acrylic acid, itaconic acid, maleic acid, and fumaric acid and anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy (mono, di, tri, and poly)ethylene glycol (meth)acrylates. As the hydrophilic unit, a unit derived from an anionic monomer is preferably used. In the hydrophilic units of the water-soluble acrylic resin, the proportion of the units derived from anionic monomers is preferably 90.0% by mass or more. The proportion is more preferably 95.0% by mass or more. Specifically, the proportion is particularly preferably 100.0% by mass. In other words, the hydrophilic units particularly preferably consist of the units derived from anionic monomers alone.

Examples of the cation constituting the salt of an acidic monomer include a lithium ion, a sodium ion, a potassium ion, an ammonium ion, and organic ammonium ions. The water-soluble acrylic resin used in the ink of the present invention preferably has an acid value in order to stably disperse the pigment. On this account, the hydrophilic unit preferably contains a unit derived from the above-mentioned anionic monomer. The water-soluble acrylic resin having an anionic unit typically exhibits water-solubility when being neutralized with a neutralizer such as hydroxides of alkali metals (for example, lithium, sodium, and potassium) and aqueous ammonia.

The hydrophobic unit (a unit not having a hydrophilic group such as an acidic group or a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso) propyl (meth)acrylate, (n-, iso-, t-)butyl (meth)acrylates, and 2-ethylhexyl (meth)acrylate (i.e., (meth)acrylate monomers).

The water-soluble acrylic resin preferably has a unit derived from (meth)acrylic acid as the hydrophilic unit and also preferably has a unit derived from a monomer having an aromatic ring as the hydrophobic unit. The water-soluble acrylic resin more preferably has a unit derived from methacrylic acid as the hydrophilic unit and also more preferably has a unit derived from at least one monomer of styrene and α-methylstyrene as the hydrophobic unit. Such a water-soluble acrylic resin is likely to interact particularly with the pigment and thus is preferred.

Of the two or more units in the water-soluble acrylic resin, a unit derived from a monomer that gives a homopolymer having a glass transition temperature Tg of 0° C. or more is required to be contained in a proportion of 95.0% by mass or more. If the proportion is less than 95.0% by mass, both the beading resistance and the glossiness of images become insufficient for the following reasons. The movable region of the water-soluble acrylic resin, which is a resin dispersant of the pigment, becomes large, and the nonionic fluorinated surfactant is likely to be adsorbed onto the particle surface of the pigment. Accordingly, the fluorinated surfactant is present on the surface of an image recorded. In addition, the pigment cannot be prevented from aggregating. The proportion is preferably 100.0% by mass or less.

The glass transition temperature Tg (° C.) of the homopolymer can be determined by a usual manner using a thermal analyzer such as a differential scanning calorimeter (DSC) according to JIS K 6240:2011, for example. The glass transition temperatures Tg (° C.) of homopolymers of typical monomers are shown in Table 1. These values are described in POLYMER HANDBOOK, JOHN WILEY & SONS, INC. and polymer database (http://polymer.nims.go.jp/), for example.

TABLE 1

Monomer kind and Tg

| Kind | Abbreviation | Glass transition temperature Tg (° C.) of homopolymer |
|---|---|---|
| Methacrylic acid | MAA | 228 |
| a-methylstyrene | αMSt | 168 |
| Acrylic acid | AA | 110 |
| Methyl methacrylate | MMA | 105 |
| Styrene | St | 100 |
| Benzyl methacrylate | BzMA | 54 |
| Vinyl acetate | VAc | 32 |
| n-Butyl methacrylate | nBMA | 20 |
| Benzyl acrylate | BzA | 12 |
| Methyl acrylate | MA | 9 |
| 2-Ethylhexyl methacrylate | 2EHMA | −10 |
| n-Butyl acrylate | nBA | −54 |
| 2-Ethylhexyl acrylate | 2EHA | −60 |
| Lauryl methacrylate | LMA | −65 |

The water-soluble acrylic resin (resin dispersant) may have any molecular structure and have any of a linear structure, a branched structure, a random copolymer structure, and a block copolymer structure.

The resin dispersant used in the ink of the present invention is required to be a water-soluble acrylic resin. In the present invention, "water-soluble acrylic resin" means an acrylic resin that can be dissolved in an aqueous medium and can be present in an aqueous medium in such a form as to have no particle size. If the resin dispersant is water-dispersible (water-insoluble), the storage stability of the ink slightly deteriorates and the pigment dispersivity becomes unstable. On this account, when the ink is applied to a recording medium, the water evaporates and thus the viscosity increases markedly. Consequently, the glossiness of the resulting images deteriorates significantly.

The kind of the resin dispersing a pigment in an ink that contains a plurality kinds of resins can be determined by the following procedure. An ink is concentrated or diluted to prepare a liquid having a total solid content of about 10% by mass. The prepared liquid is centrifuged at 12,000 rpm for 1 hour. By the centrifugation, a liquid layer containing a water-soluble organic solvent, resins not contributing the dispersion, and the like is separated from a precipitate including the pigment, and the precipitate is taken out. The resin contained in the precipitate taken out in this manner is recognized as the resin dispersing the pigment. In other words, the resin contained as the main component in the precipitate is the resin contributing the dispersion of the pigment (resin dispersant). Meanwhile, the resin contained as the main component in the liquid layer is a resin not contributing the dispersion of the pigment. In the ink of the present invention, the resin contained as the main component in the precipitate containing the pigment is required to be a water-soluble acrylic resin.

Whether the acrylic resin or the urethane resin is water-soluble is determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When the particles having particle sizes are not observed, such a resin can be recognized to be water-soluble. The conditions for the measurement are as follows:

Measurement Conditions
Set-Zero: 30 seconds
Number of measurements: three times
Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The water-soluble acrylic resin preferably has an acid value of 50 mg KOH/g or more to 350 mg KOH/g or less and more preferably 80 mg KOH/g or more to 250 mg KOH/g or less. If the water-soluble acrylic resin has an acid value of less than 50 mg KOH/g, the ejecting performance of the ink slightly deteriorates in some cases. If the water-soluble acrylic resin has an acid value of more than 350 mg KOH/g, the storage stability of the ink slightly deteriorates in some cases. The acid value of the water-soluble acrylic resin can be determined by potentiometric titration, for example.

The water-soluble acrylic resin preferably has a weight-average molecular weight Mw of 1,000 or more to 30,000 or less and more preferably 3,000 or more to 15,000 or less. The water-soluble acrylic resin preferably has a polydispersity (ratio Mw/Mn of weight-average molecular weight Mw and number-average molecular weight Mn) of 1.0 or more to 3.0 or less. The weight-average molecular weight Mw, the number-average molecular weight Mn, and the polydispersity Mw/Mn of the water-soluble acrylic resin can be determined by size exclusion chromatography (GPC method) in accordance with JIS Handbook, Chemical analysis K0124.

The content (% by mass) of the water-soluble acrylic resin in the ink is preferably 0.01% by mass or more to 5.00% by mass or less and more preferably 0.02% by mass or more to 3.00% by mass or less based on the total mass of the ink. In the ink, the content (% by mass) of the water-soluble acrylic resin relative to the content (% by mass) of the pigment is preferably 0.05 times or more to 5.0 times or less and more preferably 0.1 times or more to 2.0 times or less.

Water-Soluble Urethane Resin

The ink of the present invention contains a water-soluble urethane resin. In the present invention, "water-soluble urethane resin" means a urethane resin that can be dissolved in an aqueous medium and be present in an aqueous medium in such a form as to have no particle size. Whether the urethane resin is water-soluble is specifically determined by the same procedure in the above case of the water-soluble acrylic resin.

If the urethane resin that can be present in an aqueous medium in a form with a particle size, such as a urethane resin emulsion and a water-dispersible (water-insoluble) urethane resin, is used, the film formability becomes low, and the resulting images have insufficient glossiness. The urethane resin that can be present in an aqueous medium in a form with a particle size has many hydrophobic moieties. On this account, if such a urethane resin is present together with a nonionic fluorinated surfactant, the fluorinated surfactant is adsorbed to the hydrophobic moiety of the urethane resin. Accordingly, the fluorinated surfactant is present on the surface of an image recorded, and thus the beading cannot be suppressed.

The water-soluble urethane resin can be prepared by reacting a polyisocyanate with a polyol, for example. The water-soluble urethane resin can be prepared by further reacting a chain extender. The water-soluble urethane resin can also be a hybrid resin prepared by bonding a urethane resin to another resin.

The water-soluble urethane resin has a weight-average molecular weight of 6,000 or more. If the water-soluble urethane resin has a weight-average molecular weight of less than 6,000, the viscosity of the ink does not slowly increase, and almost no water-soluble urethane resin is left on the formed pigment layer even in a condition where the nonionic fluorinated surfactant is used in combination. On this account, the surface of a pigment layer has poor wettability, and the resulting images have insufficient glossiness.

The water-soluble urethane resin preferably has a weight-average molecular weight of 30,000 or less. If the water-soluble urethane resin has a weight-average molecular weight of more than 30,000, the water-soluble urethane resin has higher film formability to increase the filling function, and thus the beading resistance deteriorates in some cases. The water-soluble urethane resin more preferably has a weight-average molecular weight of 10,000 or more to 20,000 or less. The water-soluble urethane resin preferably has an acid value of 10 mg KOH/g or more to 110 mg KOH/g or less.

As the polyisocyanate, an aliphatic polyisocyanate or an aromatic polyisocyanate can be used, for example. Specific examples of the aliphatic diisocyanate include polyisocyanates having a chain structure, such as tetramethylene diisocyanate, hexamethylene diisocyanate, dodecamethylene diisocyanate, 2,2,4-trimethylhexamethylene diisocyanate, 2,4,4-trimethylhexamethylene diisocyanate, lysine diisocyanate, 2-methylpentane 1,5-diisocyanate, and 3-methylpentane 1,5-diisocyanate; and polyisocyanates having a cyclic structure, such as isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanate methyl)cyclohexane.

Specific examples of the aromatic polyisocyanate include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, 1,4-phenylene diisocyanate, dialkyldiphenylmethane diisocyanate, tetraalkyldiphenylmethane diisocyanate, and α,α,α',α'-tetramethylxylylene diisocyanate.

As the polyol, long-chain polyols having a number-average molecular weight of about 450 to 4,000, such as polyether polyols, polyester polyols, and polycarbonate polyols; and short-chain polyols such as polyols having a hydrophilic group are usable. It is preferred to use a water-soluble urethane resin synthesized by using a polyether polyol specifically selected from the long-chain polyols. The water-soluble urethane resin synthesized by using the polyether polyol is unlikely to undergo hydrolysis and thus enables recording of images with excellent glossiness even after the ink is stored for a long period of time.

Examples of the polyether polyol include addition polymers of alkylene oxides and polyols; and glycols such as (poly)alkylene glycols. Examples of the alkylene oxide include ethylene oxide, propylene oxide, butylene oxide, and α-olefin oxides. Examples of the polyols to be subjected to addition polymerization with the alkylene oxide include diols such as 1,3-propanediol, 1,3-butanediol, 1,4-butanediol, 1,5-pentanediol, 1,6-hexanediol, 3-methyl-1,5-pentanediol, 2-butyl-2-ethyl-1,3-propanediol, 1,4-cyclohexanediol, 1,4-cyclohexanedimethanol, 4,4-dihydroxyphenylpropane, 4,4-dihydroxyphenylmethane, hydrogenated bisphenol A, dimethylolurea, and derivatives thereof; and triols such as glycerol, trimethylolpropane, 1,2,5-hexanetriol, 1,2,6-hexanetriol, pentaerythritol, trimethylol melamine and derivatives thereof, and polyoxypropylenetriol. Examples of the glycols include (poly)alkylene glycols such as hexamethylene glycol, tetramethylene glycol, ethylene glycol, diethylene glycol, triethylene glycol, tetraethylene glycol, polyethylene glycol, propylene glycol, dipropylene glycol, tripropylene glycol, polypropylene glycol, (poly)tetramethylene glycol, and neopentyl glycol; and ethylene glycol-propylene glycol copolymers.

Examples of the polyester polyol include acid esters. Examples of the acid component constituting the acid esters include aromatic dicarboxylic acids such as phthalic acid, naphthalenedicarboxylic acid, biphenyldicarboxylic acid, and tetrahydrophthalic acid; alicyclic dicarboxylic acids such as hydrogenated products of the aromatic dicarboxylic acids; and aliphatic dicarboxylic acids such as malonic acid, succinic acid, tartaric acid, oxalic acid, glutaric acid, adipic acid, pimelic acid, suberic acid, azelaic acid, sebacic acid, alkyl succinic acids, linoleic acid, maleic acid, fumaric acid, mesaconic acid, citraconic acid, and itaconic acid. Anhydrides, salts, and derivatives (including alkyl esters and acid halides) thereof are also usable as the acid component, for example. Examples of the component to form an ester with the acid component include polyols such as diols and triols; and glycols such as (poly)alkylene glycols. Examples of the polyols and the glycols include those exemplified as the components constituting the above polyether polyol.

As the polycarbonate polyol, a polycarbonate polyol produced by a known method can be used. Specific examples of the polycarbonate polyol include alkane diol polycarbonate diols such as polyhexamethylene carbonate diol. Other examples include polycarbonate diols prepared by reacting a carbonate component such as alkylene carbonates, diaryl carbonates, and dialkyl carbonates or phosgene with an aliphatic diol component.

Examples of the polyol having a hydrophilic group as a specific example of the short-chain polyol include polyols having an acid group such as a carboxy group, a sulfonic acid group, and a phosphonic acid group; and polyols having a hydrophilic group such as a carbonyl group and a hydroxy group in the structure thereof. It is particularly preferred to use a water-soluble urethane resin synthesized by further using a polyol having an acid group, such as dimethylolpropionic acid and dimethylolbutanoic acid in addition to the long-chain polyol. The acid group may be a salt form. Examples of the cation constituting the salt include a lithium ion, a sodium ion, a potassium ion, an ammonium ion, and organic ammonium ions.

The chain extender is a compound capable of reacting with a remaining isocyanate group that fails to form a urethane bond among the polyisocyanate units in the urethane prepolymer prepared by reacting a polyisocyanate and a polyol. As the chain extender, polyvalent amines such as dimethylol ethylamine, ethylenediamine, and diethylenetriamine; polyvalent imines such as polyethylene polyimine; and polyhydric alcohols such as neopentyl glycol and butylethylpropanediol are usable. Specifically, the polyhydric alcohol is preferably used as the chain extender. When the water-soluble urethane resin synthesized by using the polyhydric alcohol as the chain extender is used, the glossiness of images can be effectively improved. Among the polyhydric alcohols, neopentyl glycol is particularly preferred.

The water-soluble urethane resin synthesized by using the polyvalent amine or the polyvalent imine as the chain extender has a cationic moiety in the structure thereof and thus is likely to aggregate. This is likely to deteriorate the smoothness of images recorded and slightly deteriorates the improvement effect of the glossiness of images in some cases. In contrast, the water-soluble urethane resin synthesized by using the polyhydric alcohol such as neopentyl glycol as the chain extender has no cationic moiety in the structure thereof and thus can particularly effectively improve the glossiness of images.

The content (% by mass) of the water-soluble urethane resin in the ink is preferably 0.10% by mass or more to 5.00% by mass or less, more preferably 0.10% by mass or more to 3.00% by mass or less and particularly preferably 0.50% by mass or more to 1.50% by mass or less based on the total mass of the ink. In the ink, the content (% by mass) of the water-soluble urethane resin relative to the content (% by mass) of the water-soluble acrylic resin is preferably 0.1 times or more to 5.0 times or less. If the mass ratio of the content of the water-soluble urethane resin relative to the content of the water-soluble acrylic resin is less than 0.1 times, the amount of the water-soluble urethane resin is small relative to the amount of the water-soluble acrylic resin, and thus the water-soluble urethane resin is insufficiently filled in gaps of the pigment in some cases. This slightly deteriorates the improvement effect of the glossiness of images in some cases. If the mass ratio of the content of the water-soluble urethane resin relative to the content of the water-soluble acrylic resin is more than 5.0 times, the amount of the water-soluble urethane resin is large relative to the amount of the water-soluble acrylic resin, and thus the ejecting performance of the ink cannot be maintained at a high level in some cases.

Nonionic Fluorinated Surfactant

The ink of the present invention contains a nonionic fluorinated surfactant. As the nonionic fluorinated surfactant, a general purpose surfactant can be used. Examples of the nonionic fluorinated surfactant include perfluoroalkyl ethylene oxide adducts, perfluoroalkylamine oxide adducts, and perfluoroalkyl sulfonamide oxyethylene adducts the hydrophilic moiety of which is composed of a polyoxyethylene chain. Among them, the perfluoroalkyl ethylene oxide adducts are particularly preferred.

As the nonionic fluorinated surfactant, a surfactant having good water-solubility is preferably used. Among the examples of the nonionic fluorinated surfactants, the surfactant having good water-solubility is exemplified by the perfluoroalkyl ethylene oxide adducts. More specifically, commercial products available under the trade names, MEGAFACE F-470 and F-444 (manufactured by DIC Co.); Surflon S-141 and S-145 (manufactured by Asahi Glass Co.); and Zonyl FS-3100 (manufactured by Du Pont Co.) can be exemplified.

The nonionic fluorinated surfactant is preferably a linear perfluoroalkyl ethylene oxide adduct. If a branched perfluoroalkyl ethylene oxide adduct is used, the difference in polarity between the perfluoroalkyl group as the hydrophobic moiety and the ethylene oxide group as the hydrophilic moiety markedly becomes large. On this account, if the branched perfluoroalkyl ethylene oxide adduct is present together with the water-soluble urethane resin having a weight-average molecular weight of 6,000 or more, the viscosity is likely to increase rapidly, and thus the glossiness of images deteriorates in some cases.

The perfluoroalkyl group of the perfluoroalkyl ethylene oxide adduct preferably has six or less carbon atoms. If the number of carbon atoms is more than six, fluorine atoms having a large atomic radius cover the periphery of a helical carbon chain, and thus the carbon chain becomes long. This structure makes the perfluoroalkyl group have a rod-shaped structure with higher rigidity and lower flexibility. On this account, the hydrophobic moiety has higher stability and higher hydrophobicity, and thus the perfluoroalkyl ethylene oxide adduct is more likely to be adsorbed onto the particle surface of the pigment. This reduces the effect of improving the beading resistance or the glossiness of images in some cases. The number of carbon atoms is preferably 2 or more and more preferably 4 or more.

The content (% by mass) of the nonionic fluorinated surfactant in the ink is preferably 0.01% by mass or more to 0.50% by mass or less and more preferably 0.01% by mass or more to 0.30% by mass or less based on the total mass of the ink. The content of the nonionic fluorinated surfactant in the ink is preferably set so as to give an ink surface tension of 25.0 mN/m or more.

Aqueous Medium

The ink of the present invention contains water or an aqueous medium that is a mixed solvent of water and a water-soluble organic solvent. As the water, deionized water (ion-exchanged water) is preferably used. The content (% by mass) of the water in the ink is preferably 10.00% by mass or more to 90.00% by mass or less based on the total mass of the ink.

The water-soluble organic solvent may be any water-soluble solvent, and can be an alcohol, a polyhydric alcohol, a polyglycol, a glycol ether, a nitrogen-containing polar solvent, or a sulfur-containing polar solvent, for example. The content (% by mass) of the water-soluble organic solvent in the ink is preferably 3.00% by mass or more to 50.00% by mass or less and more preferably 15.00% by mass or more to 40.00% by mass or less based on the total mass of the ink. If the content of the water-soluble organic solvent is out of this range, a high level of ink ejecting stability cannot be sufficiently achieved in some cases.

Other Additives

The ink of the present invention can contain water-soluble organic compounds that are solid at normal temperature, including polyhydric alcohols such as trimethylolpropane and trimethylolethane and urea and derivatives thereof as necessary in addition to the above-mentioned components. The ink of the present invention can also contain various additives such as surfactants, pH adjusters, anticorrosives, antiseptic agents, antifungal agents, antioxidants, reduction inhibitors, evaporate accelerators, chelating agents, and other resins as necessary. The ink of the present invention can further contain common surfactants other than the above-mentioned nonionic fluorinated surfactant. In particular, combination use of an acetylene glycol surfactant and the nonionic fluorinated surfactant can improve the ink stability.

Surface Tension of Ink

The ink of the present invention preferably has a static surface tension of 25.0 mN/m or more and more preferably 26.0 mN/m or more. The inventors of the present invention have observed the process of application and permeation of an ink to a recording medium with the static surface tension of the ink varied. The result has revealed that an ink having a static surface tension of 25.0 mN/m or more improves the permeability in an area where the ink is applied in a large amount. This is thought to be because the balance between the capillary force (force of a pigment layer absorbing an ink) to an ink subsequently applied and wetting and spreading of an ink containing the water-soluble urethane resin having a weight-average molecular weight of 6,000 or more is excellent in the gaps and pores of a pigment layer. If the ink has a static surface tension of less than 25.0 mN/m, the ink spreads but the permeability of the ink deteriorates due to a lower capillary force, and thus the beading resistance slightly deteriorates in some cases.

If the ink has a static surface tension of 26.0 mN/m or more, the capillary force to the ink is optimized. On this account, the water-soluble urethane resin having a weight-average molecular weight of 6,000 or more is efficiently left on the pigment layer, and the ink spreads to a larger area. This further improves the glossiness of images. The ink preferably has a static surface tension of 40.0 mN/m or less, more preferably 35.0 mN/m or less, and particularly preferably 30.0 mN/m or less.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
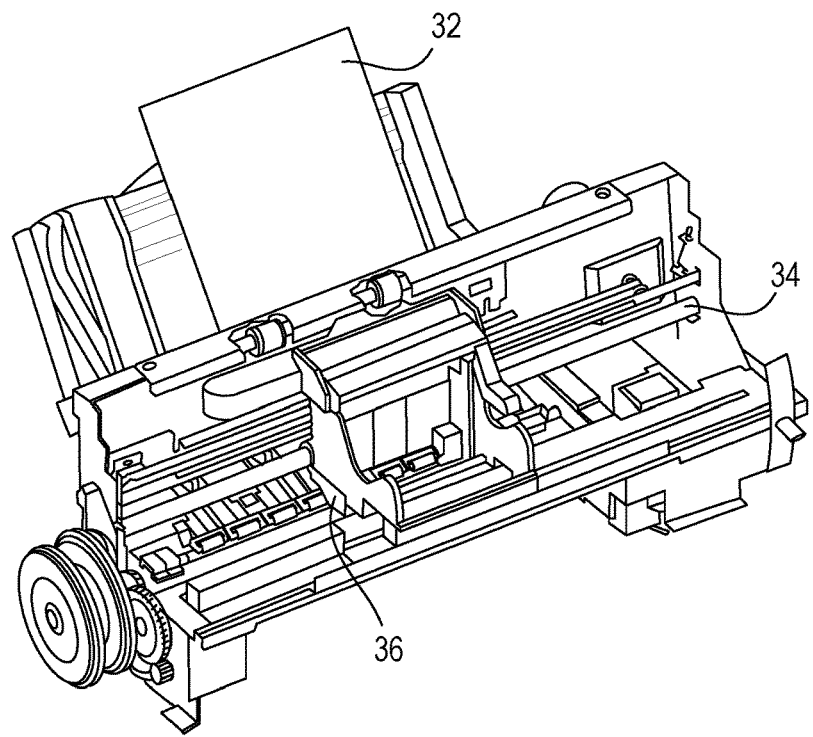
FIGS. 2A and 2B are schematic views illustrating an exemplary ink jet recording apparatus used for an ink jet recording method of the present invention.
Figure 2B:
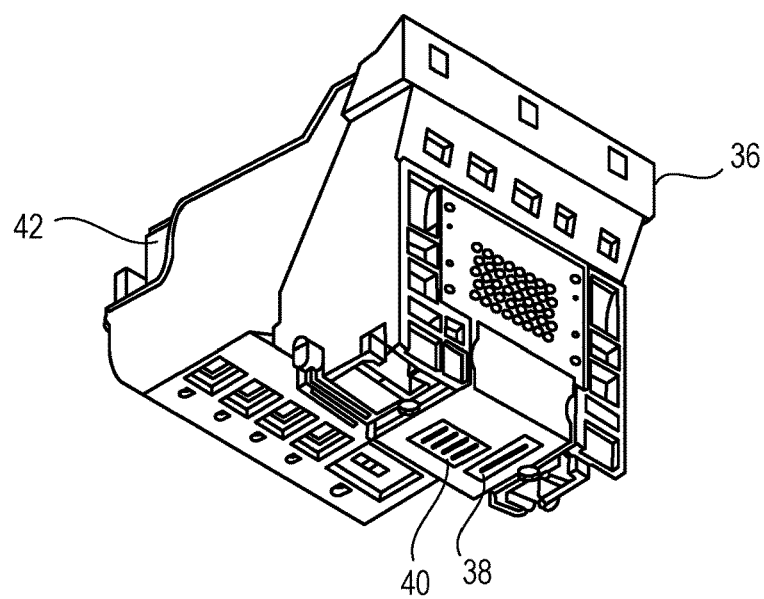

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or on the vicinity thereof. Such a recording medium can be selected depending on an intended use purpose of a recorded article on which an image is recorded. Example of the recording medium include glossy papers that are suitable for giving images having glossiness of photographic image quality and art papers that take advantage of substrate textures (for example, drawing-paper-like texture, canvas-like texture, and Japanese-paper-like texture) in order to express preferred images such as pictures, photographs, and graphic images. Specifically, what is called a glossy paper having a glossy surface of a coating layer is particularly preferably used.

EXAMPLES

The present invention will next be described in further detail with reference to examples and comparative examples, but the invention is not intended to be limited to the following examples without departing from the scope of the invention. The amounts of components expressed with "part" or "%" are based on mass unless otherwise noted.

Synthesis of Water-Soluble Acrylic Resin

The monomers (unit: part) shown in Table 2 were copolymerized in usual ways to synthesize acrylic resins 1 to 7. To the obtained acrylic resins, a 10.0% aqueous potassium hydroxide solution in an amount equivalent to the acid value and an appropriate amount of ion-exchanged water were added, giving aqueous solutions of the acrylic resins 1 to 7 having a resin content (solid content) of 20.0%. The aqueous solutions of the acrylic resins 1 to 7 were diluted 10-fold (in terms of volume) with pure water to prepare samples. The particle size of each sample was determined by dynamic light scattering with a particle size analyzer (trade name "UPA-EX150", manufactured by NIKKISO CO., LTD.) under conditions of a Set-Zero of 30 seconds, a number of measurements of three times, and a measurement time of 180 seconds. As a result, no particle size was observed in each acrylic resin, and this revealed that each acrylic resin was water-soluble. The glass transition temperature Tg (° C.) was determined according to JIS K 6240:2011 by differential scanning calorimeter (trade name "Q200", manufactured by TA INSTRUMENTS CO., LTD.). In the determination, dried resin was used as a measurement sample and the glass transition temperature was determined under the condition of temperature rising rate of from room temperature (25° C.) to 200° C. by 10° C./min. In Table 2, the kinds (abbreviations) of the monomers are the same as those shown in Table 1; Tg represents the glass transition temperature of a homopolymer; and Mw represents the molecular weight.

KISO CO., LTD.) under conditions of a Set-Zero of 30 seconds, a number of measurements of three times, and a measurement time of 180 seconds. As a result, no particle size was observed in each urethane resin, and this revealed that each urethane resin was water-soluble.

TABLE 2

Constitutions and characteristics of acrylic resins

| | | Monomer | | | | | | Proportion (%) of | |
|---|---|---|---|---|---|---|---|---|---|
| Kind<br>Tg(° C.)<br>Mw | St<br>100<br>104.15 | BzMA<br>54<br>176.21 | LMA<br>−65<br>254.41 | αMSt<br>168<br>118.18 | nBA<br>−54<br>128.17 | MAA<br>228<br>86.09 | AA<br>110<br>72.06 | monomer<br>unit with<br>Tg ≥0° C. | Acid value<br>(mg KOH/g)<br>of resin |
| Acrylic resin number 1 | 68.0 | | 5.0 | | | 27.0 | | 95.0 | 175 |
| 2 | 50.0 | 23.0 | | | | 27.0 | | 100.0 | 175 |
| 3 | 69.0 | | | 10.0 | | | 21.0 | 100.0 | 165 |
| 4 | 73.0 | | | | | 27.0 | | 100.0 | 175 |
| 5 | 74.0 | | | | 5.0 | | 21.0 | 95.0 | 165 |
| 6 | 63.0 | | 10.0 | | | 27.0 | | 90.0 | 175 |
| 7 | 71.0 | | | | 8.0 | | 21.0 | 92.0 | 165 |

Synthesis of Water-Insoluble Acrylic Resin

By referring to the description of Production Example 1 in Japanese Patent Application Laid-Open No. 2008-266363, a water-insoluble polymer was synthesized. To the obtained water-insoluble polymer, 10.0% aqueous potassium hydroxide solution in an amount equivalent to the acid value and an appropriate amount of ion-exchanged water were added, giving an aqueous dispersion of acrylic resin 8 having a resin content (solid content) of 20.0%. The obtained aqueous dispersion was subjected to measurement by dynamic light scattering in the same manner as in the case of the aqueous solutions of the acrylic resins 1 to 7 to observe the particle size. The result revealed that the acrylic resin 8 was water-insoluble.

Synthesis of Water-Soluble Urethane Resin

Into a four-necked flask equipped with a thermometer, a stirrer, a nitrogen inlet tube, and a condenser, 240.0 g of poly(propylene) glycol having a number-average molecular weight of 1,000, 282.0 g of isophorone diisocyanate, and 0.007 g of dibutyltin dilaurate were placed. Under a nitrogen gas atmosphere, the mixture was caused to react at a temperature of 100° C. for 5 hours. The mixture was cooled to a temperature of 65° C. or less, then 110 g of dimethylolpropionic acid, 10.0 g of neopentyl glycol, and 447.8 g of methyl ethyl ketone were added, and the resulting mixture was caused to react at a temperature of 80° C. for the reaction time shown in Table 3. Methanol was then added to stop the reaction. Consequently, water-soluble urethane resins 1 to 5 having a linear structure and having an acid value of 55 mg KOH/g were obtained. The weight-average molecular weights in terms of polystyrene of the resins are as shown in Table 3. To the obtained urethane resins, potassium hydroxide in an amount equivalent to the acid value and an appropriate amount of ion-exchanged water were added, and the resins were neutralized and dissolved at a temperature of 80° C., giving aqueous solutions of the urethane resins 1 to 5 having a resin content (solid content) of 10.0%. The aqueous solutions of the urethane resins 1 to 5 were diluted 10-fold (in terms of volume) with pure water to prepare samples. The particle size of each sample was determined by dynamic light scattering with a particle size analyzer (trade name "UPA-EX150", manufactured by NIK-

TABLE 3

Synthetic conditions and characteristics of urethane resin

| Urethane<br>resin<br>number | Reaction<br>time<br>(hr) | Weight-average<br>molecular<br>weight |
|---|---|---|
| 1 | 12 | 15,000 |
| 2 | 5 | 6,000 |
| 3 | 23 | 30,000 |
| 4 | 24 | 31,000 |
| 5 | 4.5 | 5,800 |

Preparation of Pigment Dispersion Liquid

The components (unit: part) shown in the upper part in Table 4 and 85 parts of 0.3-mm zirconia beads were placed in a batch type vertical sand mill (manufactured by Aimex Co.) and subjected to dispersion treatment for 3 hours while being cooled with water. The resulting mixture was centrifuged to remove non-dispersed components including coarse particles. Next, the mixture was subjected to pressure filtration through a cellulose acetate filter with a pore size of 3.0 μm (manufactured by ADVANTEC Co.), giving pigment dispersion liquids 1 to 14. The lower part in Table 4 show the contents (%) of the pigments and the contents (%) of the resins. The details of the materials in Table 4 are shown below.

C.I. Pigment Blue 15:3 (trade name "Hostaperm Blue B2G", manufactured by Clariant Co.)

C.I. Pigment Yellow 74 (trade name "Hansa Yellow 5GXB", manufactured by Clariant Co.)

C.I. Pigment Red 254 (trade name "Irgaphor Red BT-CF", manufactured by Ciba Specialty Chemicals Co.)

Carbon black (trade name "BLACK PEARLS 880", manufactured by Cabot Co.)

Solid solution pigment (a solid solution of C.I. Pigment Red 202 and C.I. Pigment Violet 19, trade name "Cromophtal Jet Magenta 2BC", manufactured by Ciba Specialty Chemicals Co.)

Polyoxyethylene cetyl ether (trade name "NIKKOL BC-40", manufactured by Nikko Chemicals Co.)

TABLE 4

Compositions and characteristics of pigment dispersion liquids

| | Pigment dispersion liquid | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| C.I. Pigment Blue 15:3 | 12.0 | | | | | | | | | | | | | |
| C.I. Pigment Yellow 74 | | 12.0 | | | | | | | | | | | | |
| C.I. Pigment Red 254 | | | 12.0 | | | | | | | | | | | |
| Carbon black | | | | 12.0 | | | | | | | | | | |
| Solid solution pigment | | | | | 12.0 | 12.0 | 12.0 | 12.0 | 12.0 | 12.0 | 12.0 | 12.0 | 12.0 | 12.0 |
| Aqueous solution of acrylic resin 1 | 24.0 | 24.0 | 24.0 | 24.0 | 24.0 | | | | | | | | | |
| Aqueous solution of acrylic resin 2 | | | | | | 24.0 | | | | | | | | |
| Aqueous solution of acrylic resin 3 | | | | | | | 24.0 | | | | | | | |
| Aqueous solution of acrylic resin 4 | | | | | | | | 24.0 | | | | | | |
| Aqueous solution of acrylic resin 5 | | | | | | | | | 24.0 | | | | | |
| Aqueous solution of acrylic resin 6 | | | | | | | | | | | | | 24.0 | |
| Aqueous solution of acrylic resin 7 | | | | | | | | | | | | | | 24.0 |
| Aqueous dispersion of acrylic resin 8 | | | | | | | | | | | 24.0 | | | |
| Aqueous solution of urethane resin 1 | | | | | | | | | | | | 48.0 | | |
| Polyoxyethylene cetyl ether | | | | | | | | | | 6.0 | | | | |
| Ion-exchanged water | 64.0 | 64.0 | 64.0 | 64.0 | 64.0 | 64.0 | 64.0 | 64.0 | 64.0 | 82.0 | 40.0 | 50.0 | 64.0 | 64.0 |
| Pigment content (%) | 10.0 | 10.0 | 10.0 | 10.0 | 10.0 | 10.0 | 10.0 | 10.0 | 10.0 | 10.0 | 10.0 | 10.0 | 10.0 | 10.0 |
| Resin content (%) | 4.0 | 4.0 | 4.0 | 4.0 | 4.0 | 4.0 | 4.0 | 4.0 | 4.0 | 0.0 | 4.0 | 4.0 | 4.0 | 4.0 |

Preparation of Ink

Examples 1 to 18, Comparative Examples 1 to 13

The components (unit: %) shown in the upper part in Table 5 were mixed and thoroughly stirred, and the resulting mixture was subjected to pressure filtration through a cellulose acetate filter with a pore size of 0.8 (manufactured by ADVANTEC Co.), giving each ink. The lower part in Table 5 shows the static surface tension (mN/m) of each ink determined at 25° C. by using a surface tensiometer (trade name "DY-300", manufactured by Kyowa Interface Science Co., Ltd.). The details of the materials in Table 5 are shown below. According to the following procedure, the ink of comparative example 4 was confirmed that the resin contributing the dispersion of the pigment was the water-soluble urethane resin. The ink of comparative example 4 was diluted to prepare a liquid having a total solid content of about 10%, and the prepared liquid was centrifuged at 12,000 rpm for 1 hour. By the centrifugation, a liquid layer and a precipitation were separated, and the liquid component was taken out. The resin contained in the liquid was analyzed by NMR and GPC, and main component was identified as the acrylic resin 1. Therefore the resin contributing the dispersion of the pigment was judged as the urethane resin 1.

Surfactant 1 (perfluoroalkyl ethylene oxide adduct, trade name "Zonyl FS-3100", manufactured by Du Pont Co.)

Surfactant 2 (perfluoroalkyl ethylene oxide adduct, trade name "Zonyl FSO-100", manufactured by Du Pont Co.)

Surfactant 3 (branched perfluoroalkenyl ethylene oxide adduct, trade name "FTERGENT 251", manufactured by Neos Company Ltd. Co.)

Surfactant 4 (acetylene glycol ethylene oxide adduct, trade name "Acetylenol E 100", manufactured by Kawaken Fine Chemicals Co.)

Surfactant 5 (perfluoroalkyl carboxylate, trade name "MEGAFACE F-410", manufactured by DIC Co.)

Surfactant 6 (perfluoroalkylamine, trade name "Surflon S-221", manufactured by Asahi Glass Co.)

Antiseptic agent (trade name "Proxel GXL", manufactured by Arch Chemicals Co.)

TABLE 5

Compositions and characteristics of inks

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Pigment dispersion liquid 1 | 40.00 | | | | | | | | | | | | | | | |
| Pigment dispersion liquid 2 | | 40.00 | | | | | | | | | | | | | | |
| Pigment dispersion liquid 3 | | | 40.00 | | | | | | | | | | | | | |

TABLE 5-continued

Compositions and characteristics of inks

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Pigment dispersion liquid 4 | 40.00 | | | | | | | | | | | | | | | |
| Pigment dispersion liquid 5 | | 40.00 | | | | | | | | 40.00 | 40.00 | 40.00 | 40.00 | 40.00 | 40.00 | 40.00 |
| Pigment dispersion liquid 6 | | | 40.00 | | | | | | | | | | | | | |
| Pigment dispersion liquid 7 | | | | 40.00 | | | | | | | | | | | | |
| Pigment dispersion liquid 8 | | | | | 40.00 | | | | | | | | | | | |
| Pigment dispersion liquid 9 | | | | | | 40.00 | | | | | | | | | | |
| Pigment dispersion liquid 10 | | | | | | | | | | | | | | | | |
| Pigment dispersion liquid 11 | | | | | | | | | | | | | | | | |
| Pigment dispersion liquid 12 | | | | | | | | | | | | | | | | |
| Pigment dispersion liquid 13 | | | | | | | | | | | | | | | | |
| Pigment dispersion liquid 14 | | | | | | | | | | | | | | | | |
| Aqueous solution of urethane resin 1 | 9.00 | 9.00 | 9.00 | 9.00 | 9.00 | 9.00 | 9.00 | 9.00 | 9.00 | | | | 9.00 | 9.00 | 9.00 | 9.00 |
| Aqueous solution of urethane resin 2 | | | | | | | | | | 9.00 | | | | | | |
| Aqueous solution of urethane resin 3 | | | | | | | | | | | 9.00 | | | | | |
| Aqueous solution of urethane resin 4 | | | | | | | | | | | | 9.00 | | | | |
| Aqueous solution of urethane resin 5 | | | | | | | | | | | | | | | | |
| Aqueous solution of acrylic resin 1 | | | | | | | | | | | | | | | | |
| Surfactant 1 | 0.07 | 0.07 | 0.07 | 0.07 | 0.07 | 0.07 | 0.07 | 0.07 | 0.07 | 0.07 | 0.12 | 0.07 | 0.09 | 0.10 | 0.20 | |
| Surfactant 2 | | | | | | | | | | | | | | | | |
| Surfactant 3 | | | | | | | | | | | | | | | | 0.10 |
| Surfactant 4 | | | | | | | | | | | | | | | | |
| Surfactant 5 | | | | | | | | | | | | | | | | |
| Surfactant 6 | | | | | | | | | | | | | | | | |
| Glycerol | 15.00 | 15.00 | 15.00 | 15.00 | 15.00 | 15.00 | 15.00 | 15.00 | 15.00 | 15.00 | 15.00 | 15.00 | 15.00 | 15.00 | 15.00 | 15.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Antiseptic agent | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 | 0.20 |
| Ion-exchanged water | 30.73 | 30.73 | 30.73 | 30.73 | 30.73 | 30.73 | 30.73 | 30.73 | 30.73 | 30.73 | 30.68 | 30.73 | 30.71 | 30.70 | 30.60 | 30.70 |
| Static surface tension (mN/m) | 27.0 | 27.3 | 26.9 | 27.3 | 27.0 | 26.9 | 27.3 | 27.0 | 27.1 | 26.8 | 27.2 | 27.2 | 26.0 | 25.0 | 24.0 | 27.0 |

| | Example | | Comparative Example | | | | | | | | | | | | |
|---|---|---|---|---|---|---|---|---|---|---|---|---|---|---|---|
| | 17 | 18 | 1 | 2 | 3 | 4 | 5 | 6 | 7 | 8 | 9 | 10 | 11 | 12 | 13 |
| Pigment dispersion liquid 1 | | | | | | | | | | | | | | | |
| Pigment dispersion liquid 2 | | | | | | | | | | | | | | | |
| Pigment dispersion liquid 3 | | | | | | | | | | | | | | | |
| Pigment dispersion liquid 4 | | | | | | | | | | | | | | | |
| Pigment dispersion liquid 5 | 40.00 | 40.00 | | | | | | | 40.00 | 40.00 | 40.00 | 40.00 | 40.00 | 40.00 | 40.00 |
| Pigment dispersion liquid 6 | | | | | | | | | | | | | | | |
| Pigment dispersion liquid 7 | | | | | | | | | | | | | | | |
| Pigment dispersion liquid 8 | | | | | | | | | | | | | | | |
| Pigment dispersion liquid 9 | | | | | | | | | | | | | | | |
| Pigment dispersion liquid 10 | | | 40.00 | | | | | | | | | | | | |
| Pigment dispersion liquid 11 | | | | 40.00 | | | | | | | | | | | |
| Pigment dispersion liquid 12 | | | | | 40.00 | 40.00 | | | | | | | | | |
| Pigment dispersion liquid 13 | | | | | | | 40.00 | | | | | | | | |

TABLE 5-continued

Compositions and characteristics of inks

| | | | | | | | | | | | | | | | |
|---|---|---|---|---|---|---|---|---|---|---|---|---|---|---|---|
| Pigment dispersion liquid 14 | | | | | | | 40.00 | | | | | | | | |
| Aqueous solution of urethane resin 1 | 9.00 | | 9.00 | 9.00 | 9.00 | | 9.00 | 9.00 | | | | 9.00 | 9.00 | 9.00 | |
| Aqueous solution of urethane resin 2 | | | | | | | | | | | | | | | |
| Aqueous solution of urethane resin 3 | | | | | | | | | | | | | | | |
| Aqueous solution of urethane resin 4 | | 9.00 | | | | | | | | | | | | | |
| Aqueous solution of urethane resin 5 | | | | | | | | | 9.00 | | | | | | |
| Aqueous solution of acrylic resin 1 | | | | | | 4.50 | | | | | 4.50 | | | | |
| Surfactant 1 | | | 0.07 | 0.07 | 0.07 | 0.07 | 0.07 | 0.07 | 0.07 | 0.07 | 0.07 | | | | |
| Surfactant 2 | 0.10 | 0.20 | | | | | | | | | | | | | |
| Surfactant 3 | | | | | | | | | | | | | | | |
| Surfactant 4 | | | | | | | | | | | | 1.00 | 1.00 | | |
| Surfactant 5 | | | | | | | | | | | | | | 0.10 | |
| Surfactant 6 | | | | | | | | | | | | | | | 0.10 |
| Glycerol | 15.00 | 15.00 | 15.00 | 15.00 | 15.00 | 15.00 | 15.00 | 15.00 | 15.00 | 15.00 | 15.00 | 15.00 | 15.00 | 15.00 | 15.00 |
| 1,2-Hexanediol | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Antiseptic agent | 0.20 | 0.20 | 1.20 | 0.20 | 0.20 | 0.20 | 1.20 | 1.20 | 1.20 | 0.20 | 0.20 | 0.20 | 0.20 | 1.20 | 1.20 |
| Ion-exchanged water | 30.70 | 30.60 | 29.73 | 30.73 | 30.73 | 35.23 | 29.73 | 29.73 | 29.73 | 39.73 | 35.23 | 38.80 | 29.80 | 29.70 | 29.70 |
| Static surface tension (mN/m) | 26.8 | 24.0 | 27.0 | 27.0 | 26.6 | 27.0 | 27.2 | 27.3 | 26.8 | 26.8 | 27.2 | 29.0 | 29.0 | 27.0 | 26.8 |

Comparative Example 14

By referring to the description of the example (Ink Production Example 5) in Japanese Patent Application Laid-Open No. 2011-190406, an ink (Comparative Example 14) containing 3.5% of phthalocyanine-pigment-containing polymer microparticles, 10% of urethane resin emulsion (in terms of solid content), and 0.3% of fluorinated surfactant was prepared. In the phthalocyanine-pigment-containing polymer microparticles, the proportion of the monomer units that give polymers having a Tg of 0° C. or more is 45.0%. The fluorinated surfactant is a perfluoroalkyl ethylene oxide adduct, and the urethane resin is water-insoluble.

Comparative Example 15

By referring to the description of Example 1 in Japanese Patent Application Laid-Open No. 2006-159907, an ink (Comparative Example 15) containing 3% of the anionic carbon black pigment, 1.2% of the polyurethane binder, and 0.03% of the fluorinated surfactant was prepared. The anionic carbon black pigment is a carbon black having a particle surface to which a styrene/acrylic acid copolymer having an acid value of 165 mg KOH/g is bonded (proportion of the monomer units that give polymers having a Tg of 0° C. or more is 100.0%). The fluorinated surfactant is a linear perfluoroalkyl ethylene oxide adduct, and the perfluoroalkyl group has six carbon atoms. The polyurethane binder has a weight-average molecular weight of 5,500.

Comparative Example 16

By referring to the description of Preparation Example 26 in Japanese Patent Application Laid-Open No. 2013-082885, an ink (Comparative Example 16) containing 7.0% of the microencapsulated magenta pigment, 11.3% of the binder resin, and 0.05% the of fluorinated surfactant was prepared. The binder resin is a water-dispersible (water-insoluble) urethane resin. The fluorinated surfactant is a linear perfluoroalkyl ethylene oxide adduct, and the perfluoroalkyl group has six carbon atoms.

Evaluation

An ink jet recording apparatus equipped with a recording head that ejects inks by thermal energy (trade name "PIXUS Pro 9500", manufactured by Canon Co.) was used, and the following evaluations were carried out. With the ink jet recording apparatus, the image recorded under conditions in which eight ink droplets each having a weight of 3.5 ng are applied to a unit area of 1/600 inch×1/600 inch at a resolution of 600 dpi×600 dpi is defined as a recording duty of 100%. In the present invention, a sample evaluated as "A" or "B" was regarded as an acceptable level, and a sample evaluated as was regarded as an unacceptable level based on the following criteria. The evaluation results are shown in Table 6.

Beading Resistance

Each ink prepared was used, and fifteen solid images were recorded on glossy papers (trade name "PT-101", manufactured by Canon Co.) at a recording duty ranging from 10 to 150% with an increment of 10% in a four-pass manner. The occurrence of beading phenomenon in the recorded solid image was observed, and the beading resistance was evaluated based on the following criteria.

A: In an area where a large amount of an ink was applied at a recording duty of 100 to 150%, no beading phenomenon was observed visually or at a magnification of 10, and the image was uniform.

B: In an area where a large amount of an ink was applied at a recording duty of 100 to 150%, the slight beading phenomenon was visually observed.

C: In an area where a large amount of an ink was applied at a recording duty of 100 to 150%, the beading phenomenon was visually observed, and the image was not uniform.

Glossiness

Of the recorded images in the "beading resistance" evaluation, solid images at a recording duty of 100% were evaluated in the following manner. Two fluorescent lights disposed at an interval of 10 cm were used as observation light sources and were projected on the image 2 m apart. The shapes of the fluorescent lights projected on the image were visually observed under conditions of a lighting angle of 45 degrees and an observation angle of 45 degrees, and the glossiness of the image was evaluated based on the following criteria.

A: Two fluorescent lights were clearly projected on the image.

B: The edges of two projected fluorescent lights were slightly blurred.

C: The boundary between two projected fluorescent lights was unclear.

TABLE 6

Evaluation result

|  |  | Beading resistance | Glossiness |
|---|---|---|---|
| Example | 1 | A | A |
|  | 2 | A | A |
|  | 3 | A | A |
|  | 4 | A | A |
|  | 5 | A | A |
|  | 6 | A | A |
|  | 7 | A | A |
|  | 8 | A | A |
|  | 9 | A | A |
|  | 10 | A | A |
|  | 11 | A | A |
|  | 12 | B | A |
|  | 13 | A | A |
|  | 14 | A | B |
|  | 15 | B | B |
|  | 16 | A | B |
|  | 17 | B | B |
|  | 18 | B | B |
| Comparative Example | 1 | C | C |
|  | 2 | C | C |
|  | 3 | C | C |
|  | 4 | C | C |
|  | 5 | C | C |
|  | 6 | C | C |
|  | 7 | B | C |
|  | 8 | C | C |
|  | 9 | C | C |
|  | 10 | C | C |
|  | 11 | C | B |
|  | 12 | B | C |
|  | 13 | C | C |
|  | 14 | C | C |
|  | 15 | B | C |
|  | 16 | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011093, filed Jan. 23, 2015, which is hereby incorporated by reference herein in its entirety.

What is claimed is:

1. An aqueous ink for ink jet comprising:

(1) a pigment;

(2) a water-soluble acrylic resin for dispersing the pigment;

(3) a water-soluble urethane resin; and (4) a nonionic fluorinated surfactant, wherein the pigment comprises at least one of a carbon black and an organic pigment, wherein the content (% by mass) of the pigment in the ink is 0.05% by mass or more to 15.00% by mass or less based on the total mass of the ink, wherein the water-soluble acrylic resin comprises a copolymer having two or more units derived from two or more kinds of monomers, and of the two or more units, a unit that is (i) derived from a monomer that gives a homopolymer having a glass transition temperature Tg of 0° C. or more, and (ii) contained in a proportion of 95.0% by mass or more, wherein the two or more units comprise (a) a hydrophilic unit and (b) a hydrophobic unit, wherein the two or more kinds of monomers comprise (a) an anionic monomer from which the hydrophilic unit is derived, and (b) a monomer having an aromatic ring, from which monomer the hydrophobic unit is derived, wherein the anionic monomer comprises at least one selected from the group consisting of acrylic acid and methacrylic acid, and the monomer having an aromatic ring comprises at least one selected from the group consisting of α-methylstyrene, styrene, benzyl methacrylate, and benzyl acrylate, wherein the water-soluble acrylic resin has a weight-average molecular weight of 3,000 or more to 15,000 or less, wherein the water-soluble acrylic resin has an acid value of 50 mg KOH/g or more to 350 mg KOH/g or less, wherein the content (% by mass) of the water-soluble acrylic resin in the ink is 0.02% by mass or more to 3.00% by mass or less based on the total mass of the ink, wherein the content (% by mass) of the water-soluble acrylic resin relative to the content (% by mass) of the pigment is 0.05 times or more to 5.0 times or less, wherein the water-soluble urethane resin comprises a unit derived from a polyisocyanate and a unit derived from a polyol, wherein the water-soluble urethane resin has a weight-average molecular weight of 10,000 or more and 30,000 or less, wherein the water-soluble urethane resin has an acid value of 10 mg KOH/g or more to 110 mg KOH/g or less, wherein the content (% by mass) of the water-soluble urethane resin in the ink is 0.10% by mass or more to 5.00% by mass or less based on the total mass of the ink, wherein the content (% by mass) of the water-soluble urethane resin relative to the content (% by mass) of the water-soluble acrylic resin is 0.1 times or more to 5.0 times or less, wherein the nonionic fluorinated surfactant comprises a linear perfluoroalkyl ethylene oxide adduct having a perfluoroalkyl group with six or less carbon atoms, wherein the content (% by mass) of the nonionic fluorinated surfactant in the ink is 0.01% by mass or more to 0.50% by mass or less based on the total mass of the ink, and wherein the ink has a static surface tension of 25.0 mN/m or more to 40.0 mN/m or less.

* * * * *